Patented Mar. 21, 1950

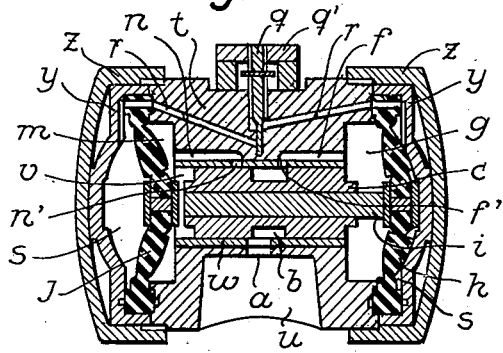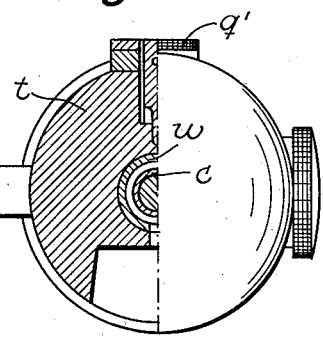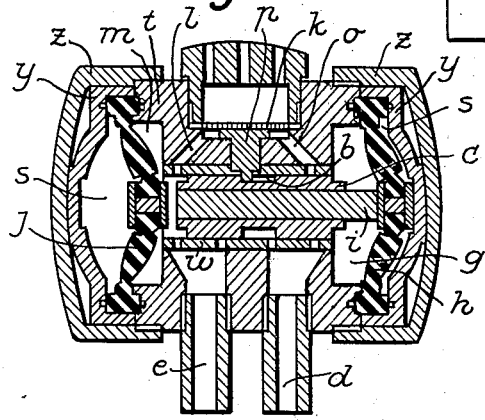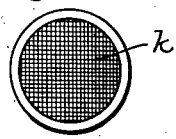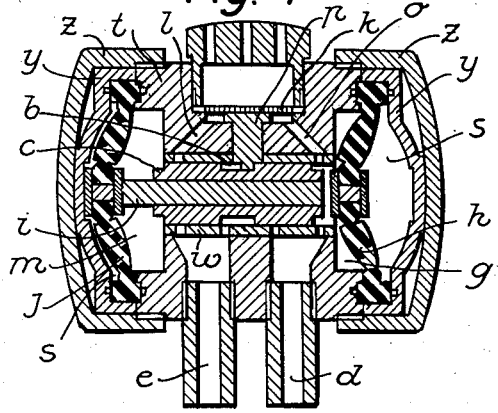

2,501,294

UNITED STATES PATENT OFFICE 2,501,294

PULSATOR FOR MILKING MACHINES

Svend Hansen Sigvard, Copenhagen, Denmark

Application December 26, 1945, Serial No. 637,178
In Denmark November 3, 1938

Section 1, Public Law 690, August 8, 1946
Patent expires November 3, 1958

2 Claims. (Cl. 31—62)

It is known to provide pulsators for milking machines with rubber diaphragms which govern a slide valve acted upon by vacuum.

In this art a milking machine pulsator is known with pneumatic breaking device and two diaphragms connected by a spindle upon which a cross bar is mounted acting on a slide valve. The spindle in this known construction has cuts which give admittance to air when they are in a position opposite the wall of the one diaphragm housing, whereby the slide valve will reverse and connect the other diaphragm housing with vacuum.

Compared with this known construction the milking machine pulsator according to the present invention is characterized thereby that the slide valve, which is acted on alternately by two diaphragms which are not interconnected, is slidable in a bore in a section piece between the diaphragms and has a rod loosely mounted in the slide valve, which rod, when pressed against by the one diaphragm, will force the other diaphragm to reverse its position.

The diaphragms will prevent dead points from occurring so that the pulsator will always start by itself and will always work when it is in connection with vacuum which will directly act on the slide valve.

The pulsator according to the present invention has further the advantage over the previously known pulsators that it works without springs, ordinary valves and pistons and that anyone easily will be able to take it apart, clean it and reassemble it as it is impossible to make mistakes at the assembling. The construction is extraordinarily simple and durable as there is no risk of springs breaking or changing their tension. Furthermore ordinary valves are not so easily taken apart and assembled as the slide valve in the present pulsator and finally the drawbacks appearing in the previously known pulsators from the fact that pistons are to be lubricated and that pistons change their pulsating velocity through temperature changes, do not occur.

By the above mentioned construction the two chambers which are placed between each of the two diaphragms and one end of the slide valve are alternately connected with vacuum. At the other side of each diaphragm is placed a chamber which through a valve may be connected with the free air, so that the diaphragm which at a certain moment is connected with vacuum at the side opposite the slide valve will reverse owing to the reduced pressure of the free air, which pressure has eventually been reduced through a reduction valve.

By this construction the pulsation frequency is regulated by adjustment of the two valves which from the free air lead to the chambers placed between the end covers of the pulsator and the diaphragms. This has, however, the drawback that the two valves when the machine is operated by a non-skilled person can be differently adjusted so that the pulsator gets a halt in its gait.

It is therefore—as also stated by a further distinguishing feature of the invention—preferred that the two chambers placed between the opposite sides of the diaphragms and the surrounding housing are connected with each other through a channel or a connecting pipe, in which a resistance to flow has been inserted, for instance, a valve, for a medium, for instance, a fluid or a gas, preferentially atmospheric air at atmospheric pressure, which during the pulsation flows from one of the said chambers to the other and back.

Practical experiments have shown that such a construction in many cases gives better results than the construction in which the two chambers are connected with the free air through valves or the like as it has appeared to be more important that the pulsator works smoothly than that the pulsation frequency is adjustable.

On the drawing

Fig. 1 shows a vertical longitudinal section through the pulsator,

Fig. 2 the same seen from one end partly in vertical section,

Fig. 3 a horizontal longitudinal section through the pulsator seen from above and with the slide valve in the same position as in Fig. 1, Fig. 4 a similar section as that of Fig. 3, but with the slide valve in another position and Fig. 5 is a plan detail of the filter element.

As it appears from the drawing the pulsator consists of a housing of cylindrical shape with end plates $y$. An intermediate section $t$ is mounted in the housing, said intermediate section having at the bottom a conical cavity $u$ which is connected with a vacuum tank not shown and which through a port $a$ communicates with a cylindrical bore $v$ in a bushing $w$ which is mounted in the intermediate section, and in which a slide valve $c$ may slide.

At the top of the intermediate section $t$ a stop rod $p$ is inserted the lower end of which extends into an annular groove $b$ in the slide valve and thereby restricts the lengthwise movement of the latter. A rod $i$, which may slide lengthwise, is mounted in the slide valve, the ends of said rod being adapted to press against two diaphragms $j$ and $h$ of rubber or the like, said diaphragms being clamped between the intermediate section $t$ and the end plate $y$ of the housing. At the one end of the intermediate section $t$ two ports $l$ and $o$ are found leading through a filter $k$ from the interior of the housing to the free air.

At the other side of the intermediate section two ports $e$ and $d$ are found leading to the nipples of the milking machine. From a chamber $m$ between the intermediate section $t$ and the diaphragm $j$ a channel $n$ communicates through an opening $n'$ in the bush $w$ and the groove $b$ with the bore $v$, and from a chamber $g$ between the intermediate section and the other diaphragm $h$ another channel $f$ communicates through an opening $f'$ in the bush $w$ and the groove $b$ with the bore $v$. Between the diaphragm and the end plates of the housing are chambers $s$. These chambers are connected with each other through channels $r$ the resistance to flow of which can be regulated by means of an adjustment screw $q$ provided with the counter nut $q'$.

The pulsator acts in the following way:

When the slide valve $c$ is in the position shown in Fig. 3 the annular groove $b$ will establish connection between the ports $a$ and $d$, while the connection between the ports $a$ and $e$ is simultaneously closed. Further the connection between the chamber $m$, the port $e$ and the port $l$ is open while the connection between the chamber $g$, the port $d$ and the port $o$ is closed.

In this position the slide valve $c$ also by means of its annular groove $b$ establishes connection between the port $a$, the channel $f$ and the chamber $g$ and closes the connection between the port $a$, the channel $n$ and the chamber $m$.

When the slide valve $c$ assumes the position shown in Fig. 4, however, the annular groove $b$ in the slide valve will establish connection between the ports $a$ and $e$, and at the same time the connection between the ports $a$ and $d$ will be closed. The connection between the chamber $g$, the port $d$ and the port $c$ is open, whereas the connection between the chamber $m$, the port $e$ and the port $l$ is closed.

In this position the slide valve $c$ also by means of its annular groove $b$ establishes connection between the channel $n$ and the chamber $m$ and closes the connection between the port $a$, the channel $f$ and the chamber $g$.

When the slide valve $c$ is in the position shown in Fig. 3, and the port $a$ in Fig. 1 is in connection with vacuum, this vacuum will extend through the channel $f$ to the chamber $g$. The vacuum also reaches through the port $d$ to the nipples in the milking machine which are in connection with this port. The diaphragm $h$ will thereby be drawn into the chamber $g$ and will first press on the rod $i$ which again acts on the diaphragm $j$ and straightens it up, whereupon it will reverse its position. Subsequently the diaphragm $h$ will press upon the slide valve $c$ which will be moved to such an extent that the connection between the ports $a$ and $n$ will be established through the annular groove $b$. Then the vacuum gets into the chamber $m$, whereby the slide valve $c$ is quickly drawn into this chamber and assumes the position shown in Fig. 4. The vacuum also reaches through the port $e$ and to the nipples which are in connection with the same.

The diaphragm $j$ will also be drawn into the chamber $m$ and will first press upon the rod $i$ which again acts on the diaphragm $h$ so that the latter straightens up and reverses its position. Subsequently the diaphragm $j$ will press upon the slide valve $c$ whereby the connection between the ports $a$ and $f$ will be reestablished through the annular groove $b$. The vacuum thereby reaches through the channel $f$ to the chamber $g$, and the slide valve $c$ is quickly drawn into this chamber so that it assumes the position shown in Fig. 3. The vacuum will also extend through the port $d$ to the nipples connected with this port.

When the slide valve $c$ is in the position shown in Fig. 3 there is passage for free air through the filter $k$, the port $l$, the chamber $m$, the channel $n$ and the port $e$ to the nipples connected with the latter, while, when the slide valve is in the position shown in Fig. 4, there is passage for free air through the filter $k$, the port $o$, the chamber $g$, the channel $f$ and the port $d$ to the nipples connected with this port.

By turning the adjusting screw $q$ the size of the opening between the channels $r$ is changed, whereby the current of air admitted to the chamber $s$ may be regulated. The current of air arises from the movement of the diaphragms $h$ and $j$ in the chambers $s$. The speed of the pulsation may in this way be adjusted as required.

Having now described my invention, what I claim as new and desire to secure by Letters Patent is:

1. In a milking machine pulsator, the combination of a body having a pair of chambers at its ends, respectively, and a longitudinal bore connecting said chambers; a pair of flexible diaphragms mounted in said chambers, respectively; a valve sleeve slidably mounted in said bore; a rod slidably mounted in said sleeve; and means controlled by said sleeve to flex said diaphragms toward said rod and said sleeve alternately, each flexed diaphragm successively sliding said rod and said sleeve, and said slid rod flexing the other diaphragm away from said rod and said sleeve.

2. In a milking machine pulsator, the combination of a body having a pair of chambers at its ends, respectively, and a longitudinal bore connecting said chambers; a valve member slidably mounted in said bore; a pair of flexible diaphragms so mounted in said chambers, respectively, as to form a pair of compartments of each chamber, the compartments of each chamber being disposed toward and remote from said valve member, respectively, said body having a conduit connecting the pair of remote compartments; an adjustable valve in said conduit for controlling the flow of air through said conduit; and means controlled by said valve member to flex said diaphragms toward said member, alternately, each flexed diaphragm sliding said member.

SVEND HANSEN SIGVARD.

REFERENCES CITED

The following references are of record in the file of this patent:

UNITED STATES PATENTS

| Number | Name | Date |
| --- | --- | --- |
| 1,484,193 | Scott | Feb. 19, 1924 |
| 2,086,868 | Hall | July 13, 1937 |

FOREIGN PATENTS

| Number | Country | Date |
| --- | --- | --- |
| 61,748 | Norway | Nov. 27, 1939 |
| 57,573 | Denmark | Apr. 22, 1940 |
| 100,206 | Sweden | Nov. 5, 1940 |